Nov. 6, 1928.

C. C. STEDMAN 1,690,141

TRACTOR

Filed Feb. 3, 1927

4 Sheets-Sheet 1

Inventor

C. C. Stedman

By Frease and Bond

Attorneys

Nov. 6, 1928.

C. C. STEDMAN 1,690,141

TRACTOR

Filed Feb. 3, 1927 4 Sheets-Sheet 2

Inventor

C.C. Stedman

By Frease and Bond

Attorneys

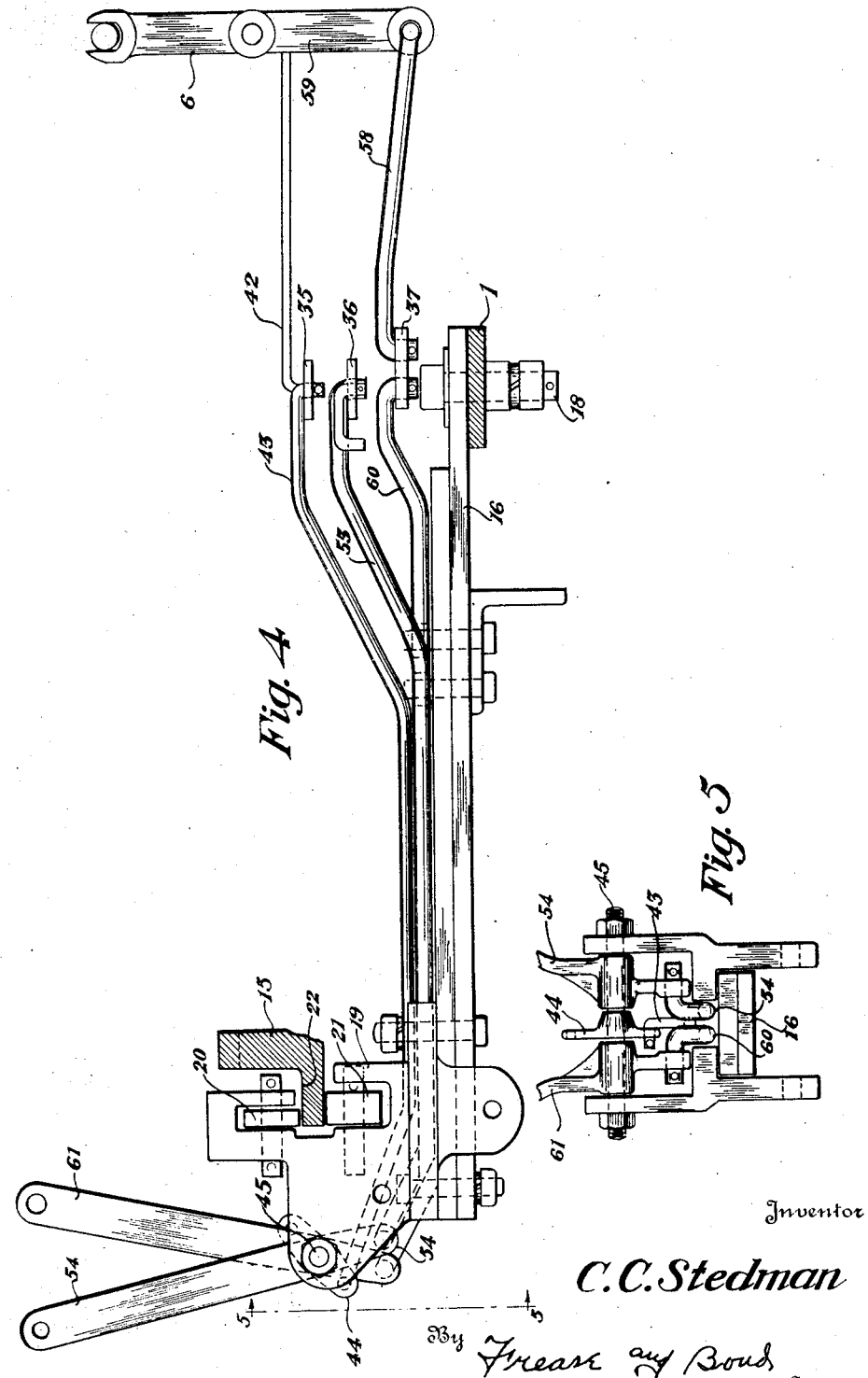

Nov. 6, 1928.
C. C. STEDMAN
1,690,141
TRACTOR
Filed Feb. 3, 1927 4 Sheets-Sheet 4
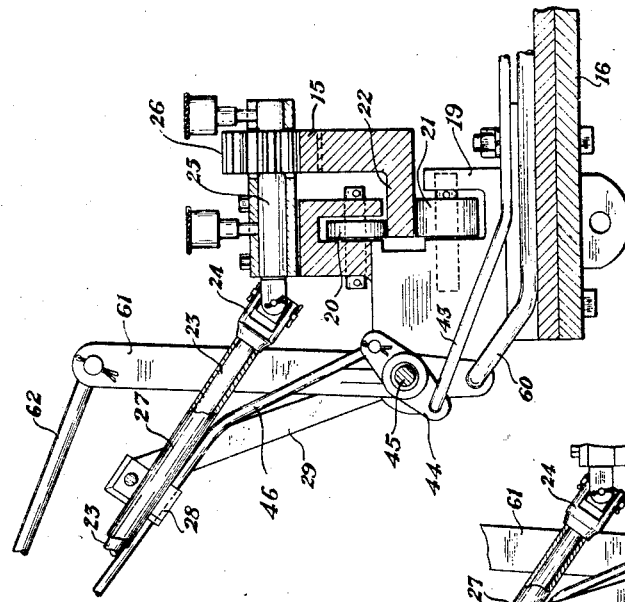
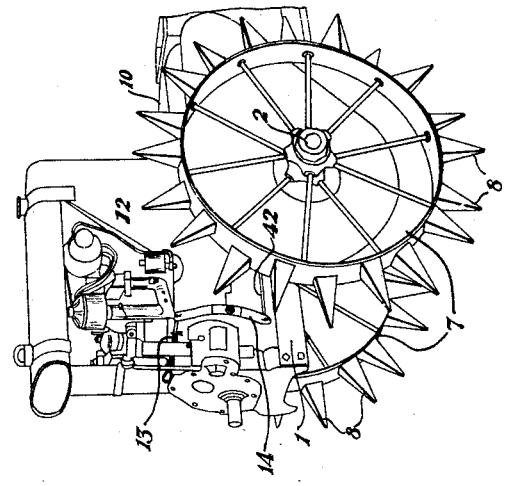
Inventor
C. C. Stedman
By Fraser and Bond
Attorneys Patented Nov. 6, 1928.

1,690,141

UNITED STATES PATENT OFFICE.

CHARLES C. STEDMAN, OF CLEVELAND, OHIO, ASSIGNOR TO THE CENTRAL TRACTOR COMPANY, OF GREENWICH, OHIO, A CORPORATION OF OHIO.

TRACTOR.

Application filed February 3, 1927. Serial No. 165,616.

The invention relates to tractors and more particularly to a type of two-wheeled tractor used for farming, industrial purposes and the like.

The object of the improvement is to provide means for controlling the tractor in all of its angular positions, from the driver's position on a sulky or any implement which may be hitched in rear of the tractor.

The above and other objects may be accomplished by providing control levers at a point convenient to the operator's position and connecting these levers by means of rods to the various controls of the tractor, floating links being provided in the rods forming movable pivotal points in the control rods arranged to normally move over or to the pivotal center between the tractor and the drawbar to which the implements are connected.

In order to prevent crowding of the clutch, gears or other control parts when the rods are not over the pivotal center, the operating members connected thereto are permitted to float, when turning the tractor in angular positions.

Figures 1, 9:
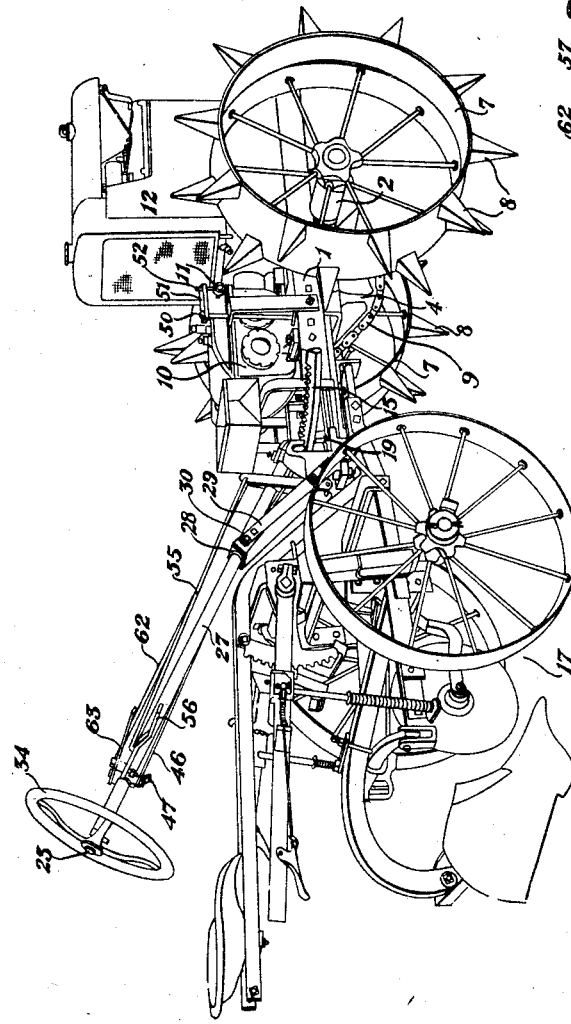
Figures 2, 3:
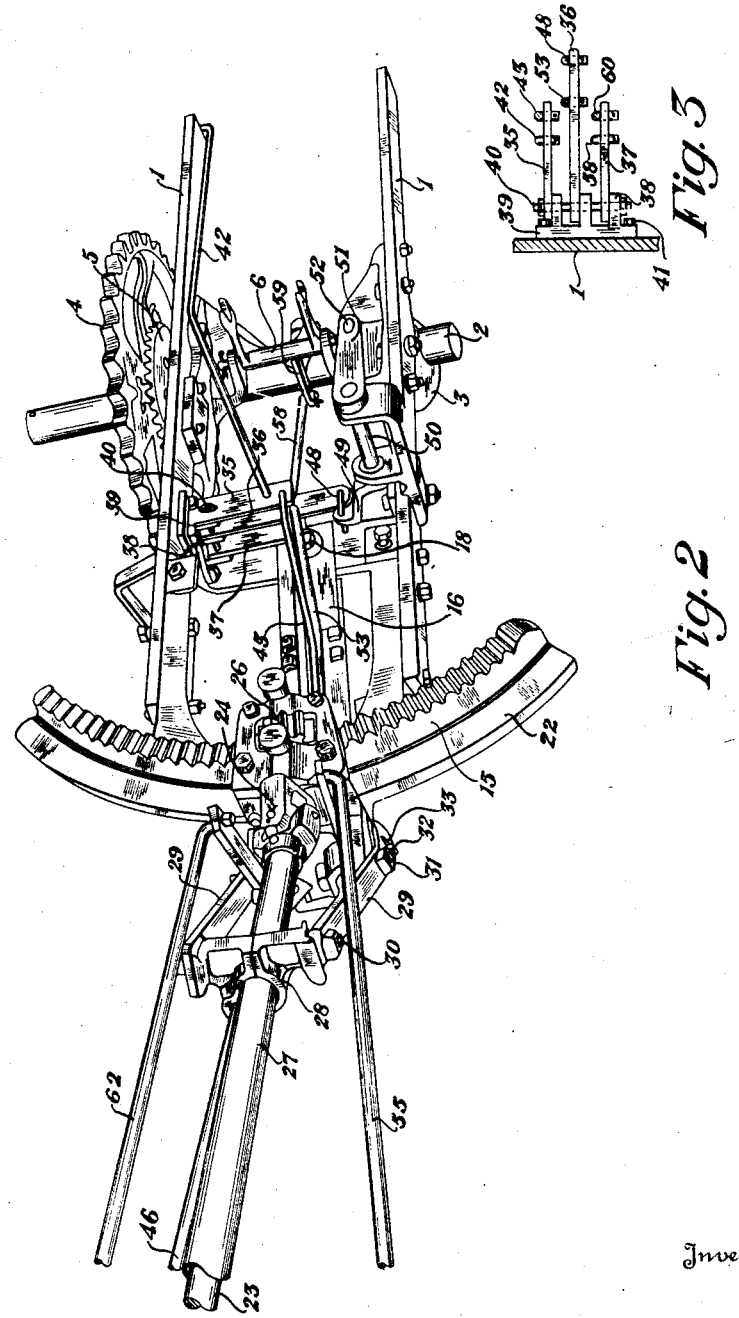

An embodiment of the invention is illustrated in the accompanying drawings, in which Figure 1 is a perspective view of the improved tractor showing a sulky plow operatively connected thereto;

Fig. 2, a plan perspective view of the control rods and links;

Fig. 3, a detached elevation of the control links;

Fig. 4, a side elevation partly in section showing the control rods and links;

Fig. 5, an end elevation of the same taken substantially at 5—5, Fig. 4.

Fig. 6, a fragmentary perspective view of the forward portion of the tractor;

Fig. 7, a sectional elevation of the steering column adjustment;

Fig. 8, a side elevation of the same; and

Fig. 9, a detail sectional view showing the connection of the floating lever to the steering column.

Similar numerals of reference indicate corresponding parts throughout the drawings.

The tractor to which the invention pertains is of the two-wheel type and is mounted upon a suitable frame 1 provided with the axle 2 located transversely through the central portion of the frame, being journaled in suitable bearings 3.

The drive sprocket 4 is mounted upon the axle 2 and associated with the clutch 5 arranged to be controlled in usual manner through the clutch yoke 6.

Traction wheels 7 are mounted upon the axle 2 and may be provided with the usual cleats 8. The tractor is thus supported upon the ground only upon the two traction wheels.

A sprocket chain 9 operatively connects the sprocket 4 with a suitable sprocket (not shown), associated with the gear housing 10 in usual manner. A rod 11 projects out from one side of the gear housing for shifting the gears in usual manner.

The engine 12 is operatively connected to the gears within the gear housing 10 in the usual manner and is provided with the usual carburetor operated through the spring pressed rod 13 and lever 14.

A gear segment 15 is fixed at the rear end of the tractor frame. The drawbar 16, carried by the sulky 17, or other implement to be drawn by the tractor, is pivotally connected to the rear end portion of the tractor frame, as by the bolt 18.

This drawbar is provided with the roller bracket portion 19, carrying the upper and lower rollers 20 and 21 respectively, which engage opposite sides of the arcuate flange 22, upon the gear segment 15.

The steering shaft 23 is provided with a universal joint 24, near its lower end, the short jointed portion 25 carrying a pinion 26 which engages the gear segment 15.

The steering shaft is located within the usual tubular column 27 and is arranged to be held in adjusted position by means of a clamp collar 28, supported by the braces 29 connected at the lower ends to the roller bracket 19.

The upper ends of the braces may be connected to the clamp collar 28 by the bolt 30, which clamps the collar upon the steering column. Two bolts, 31 and 32 are preferably provided for connecting the braces to the roller bracket, the bolt 32 being located through a transverse slot 33 in the brace.

By loosening the bolts the braces and clamp collar may be adjusted, thus adjusting the position of the steering column to accommodate different conditions. By tightening the bolts, the steering column is thus held in any desired adjusted position.

The usual steering wheel 34 is provided at the upper end of the steering shaft, convenient to the operator's position upon the sulky or other implement. While operating this steering wheel the implement may be moved to any desired angular position with reference to the tractor, while the steering column and wheel always remain in the same position relative to the implement.

In order to operate the various controls of the tractor, such as the gear shift, clutch and carburetor, a plurality of control rods is provided leading to suitable operating means upon the steering column.

In order to permit operation of these control rods in any angular position of the implement relative to the tractor, each control rod is provided with a pivotal connection adjacent to the pivotal connection between the tractor and implement, and means is provided for holding the pivotal connection of each rod in a fixed path, adjacent to said pivotal connection between the tractor and implement.

The pivotal connections in these control rods may be arranged to travel in an arcuate path and for accomplishing the same, a plurality of links 35, 36 and 37 may be pivotally connected to the ears 38 of a bracket 39 as by the bolt 40.

The bracket 39 is connected to one side of the tractor frame 1 as by bolts 41 at one side of the pivotal center 18. The rod 42 is pivotally connected to the free end portion of the link 35 and leads forward to the carburetor lever 14 to which it is operatively connected.

A rod 43 is also pivotally connected to the link 35 and leads to one end of the lever 44 pivoted upon the shaft 45 which may be carried by the roller bracket 19. A rod 46 leads from the other end of this lever upward along the steering column and is connected to the operating lever 47 mounted upon the steering column adjacent to the wheel.

The central link 36 may be longer than the other two links and the outer end thereof is pivotally connected as at 48 to a rocker arm 49 upon the rocker shaft 50. At the upper end of said rocker shaft is the slotted rocker arm 51 operatively connected to the gear shift operating rod 11 as by the pin 52.

A rod 53 is pivotally connected to the link 36 and leads backward to the lower end of the lever 54, pivoted upon the shaft 45, the upper end of said lever being connected by a rod 55 with the floating lever 56 pivoted in the block 57 mounted upon the steering column.

The rod 58 pivotally connects the free end of the lower floating link 37 with the rocker arm 59 upon the clutch operating yoke 6. A rod 60 connects the link 37 with the lower end portion of the lever 61 pivoted upon the shaft 45, the upper end of said lever being connected by the rod 62 with the operating lever 63 upon the steering column.

With this construction the pivotal connections in the several control rods for operating the various controls of the tractor are held in a fixed path by means of the floating links 35, 36 and 37, and thus permit of operation of the controls while the tractor is located in any angular position with relation to the implement.

I claim:

1. In combination with a tractor and an implement pivotally connected thereto by means of a drawbar, a gear segment carried by the tractor and located in an arc described around the pivotal center and adapted to support the drawbar and permit oscillation thereof around the pivotal center, a steering column carried by the drawbar, a pinion upon the steering column meshing with said gear segment, a plurality of links pivotally mounted upon the tractor is swung in horizontal paths, a rod operatively connecting each link with one of the controls of the tractor and a second rod pivoted normally in vertical alignment with the pivotal connection between the tractor and draw bar to each link and leading to the steering column.

2. In combination with a tractor and implement pivotally connected thereto by means of a drawbar, a gear segment carried by the tractor and located in an arc described around the pivotal center and adapted to support the drawbar and permit oscillation thereof around the pivotal center, a steering column carried by the drawbar, a steering shaft within the column, a universal joint in the steering shaft, a pinion upon the steering shaft meshing with the gear segment, a clamp mounted upon the steering column and braces attached thereto and supported upon the drawbar and means for holding the braces in adjusted position, thus permitting holding the steering column in any desired position relative to the tractor.

3. In combination with a tractor and an implement pivotally connected thereto by means of a drawbar, a gear segment carried by the tractor and located in an arc described around the pivotal center and adapted to support the drawbar and permit oscillation thereof around the pivotal center, a steering column carried by the drawbar, a steering shaft within the column, a universal joint in the steering shaft, a pinion upon the steering shaft meshing with the gear segment, a clamp mounted upon the steering column and braces attached thereto and supported upon the drawbar, each brace having an oblong hole to permit easy and accurate adjustment of the steering column, and means for holding the braces in adjusted position, thus permitting holding the steering column in any desired position relative to the tractor.

4. In combination with a tractor and an implement pivotally connected thereto by means of a drawbar, a gear segment carried by the tractor and located in an arc described around the pivotal center and adapted to support the drawbar and permit oscillation thereof around the pivotal center, a steering shaft carried by the drawbar, a pinion upon the steering shaft meshing with said gear segment, control rods leading from the various controls of the tractor to the steering column, a pivotal connection in each control rod, means for holding said pivotal connections in a horizontal path passing through the vertical axis of the pivotal connection between the tractor and implement, and a floating operating lever carried by a block on the steering column and connected to one of the control rods to permit pressure to be applied to the corresponding control when the tractor is operating at angular positions with the pivotal connection of the control link off center.

In testimony that I claim the above, I have hereunto subscribed my name.

CHARLES C. STEDMAN.